United States Patent
Doan et al.

(10) Patent No.: US 10,713,588 B2
(45) Date of Patent: Jul. 14, 2020

(54) DATA ANALYTICS SYSTEMS AND METHODS WITH PERSONALIZED SENTIMENT MODELS

(71) Applicant: salesforce.com, inc., San Francisco, CA (US)

(72) Inventors: Dai Duong Doan, Alameda, CA (US); Alexander Merritt, Halifax (CA)

(73) Assignee: salesforce.com, inc., San Francisco, CA (US)

( * ) Notice: Subject to any disclaimer, the term of this patent is extended or adjusted under 35 U.S.C. 154(b) by 1121 days.

(21) Appl. No.: 15/050,887

(22) Filed: Feb. 23, 2016

(65) Prior Publication Data
US 2017/0243120 A1    Aug. 24, 2017

(51) Int. Cl.
| G06N 20/00 | (2019.01) |
| G06Q 30/02 | (2012.01) |
| G06Q 10/06 | (2012.01) |
| G06Q 50/00 | (2012.01) |
| G06N 3/04 | (2006.01) |
| G06F 40/30 | (2020.01) |

(52) U.S. Cl.
CPC .......... *G06N 20/00* (2019.01); *G06F 40/30* (2020.01); *G06N 3/0445* (2013.01); *G06Q 10/067* (2013.01); *G06Q 30/0201* (2013.01); *G06Q 50/01* (2013.01)

(58) Field of Classification Search
CPC ........................... G06N 20/00; G06F 17/2785
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

*Primary Examiner* — Robert A Cassity
*Assistant Examiner* — Tsu-Chang Lee
(74) *Attorney, Agent, or Firm* — LKGLobal | Lorenz & Kopf, LLP

(57) ABSTRACT

A system for processing social media data includes a platform with a social media acquisition module configurable to collect a plurality of social media statements. The platform further includes an analysis engine configurable to analyze the plurality of social media statements according to a first sentiment model to generate first analytics data. The analysis engine is configurable to present the first analytics data to a client user, including a display of a sentiment value for each of the social media statements. The platform further includes a feedback queue configurable to receive feedback from the client user on at least a portion of the sentiment values; a model modification module configurable to modify the first sentiment model based on the feedback to result in a modified sentiment model; and a database configurable to store the modified sentiment model as a personalized sentiment model for the client user.

20 Claims, 9 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven, et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,631,473 B2 * | 1/2014 | Bhatia .................. H04N 21/252 726/4 |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0319342 A1 * | 12/2009 | Shilman ........... G06Q 10/06395 705/7.41 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0169582 A1 * | 6/2015 | Jain ..................... G06F 16/3332 707/748 |
| 2015/0331929 A1 * | 11/2015 | El-Saban ................ G06F 16/50 707/739 |
| 2016/0019464 A1 * | 1/2016 | Madhavan ............ G06F 16/972 706/11 |

* cited by examiner

DATA ANALYTICS SYSTEMS AND METHODS WITH PERSONALIZED SENTIMENT MODELS

TECHNICAL FIELD

Embodiments of the subject matter described herein generally relate to data analytics systems and methods with personalized sentiment models.

BACKGROUND

Online social networking sites and tools such as Facebook™, Pinterest™ Tumblr™, Google+™ Hootsuite™, and Twitter™ have changed the way people share information and otherwise communicate with each other. Even in business environments, collaborative sites enable groups of related users share information about sales opportunities or other issues surrounding products or services pursued or offered by the team. Presently known enterprise social network platforms such as Chatter™ by Salesforce™ provide users with a feed-based stream of posts for tracked objects.

In addition to the basic utility of these social media sites, the generated content may provide further insights about the people and discussion topics. One mechanism by which social media may be used by an organization is sentiment analytics (or analysis) that attempts to evaluate the reactions or feelings about postings on a particular topic, e.g., to monitor user preference on products in a marking campaign. However, social media platforms collectively generate a large amount of data that may be challenging to collect and analyze in a meaningful manner. Moreover, even if a suitable sentiment analysis may be modeled for an individual user, such models may not be applicable to other users. On the other hand, generic models may be inaccurate or otherwise unsuited for individual clients.

Accordingly, it is desirable to provide improved systems and methods for collecting, administering, and evaluating sentiment in social media data, particularly for individual clients or users. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Broadly, exemplary embodiments discussed herein provide improved systems and methods for the storage, management, and administration of information associated with social media data, particularly the transformation of basic, collected data into new types of information, such as the information generated by data analytics. In one exemplary embodiment, a client platform may present sentiment analysis according to a sentiment analytics model in a form that enables a user to view the sentiment values of social media statements, fragments, and elements. Moreover, the client platform may accept feedback in the form of modifications to the sentiment values of the social media statements, fragments, and elements, and in response, modify the sentiment analytics model to result in a personalized sentiment analytics model for the respective client.

Figure 1:
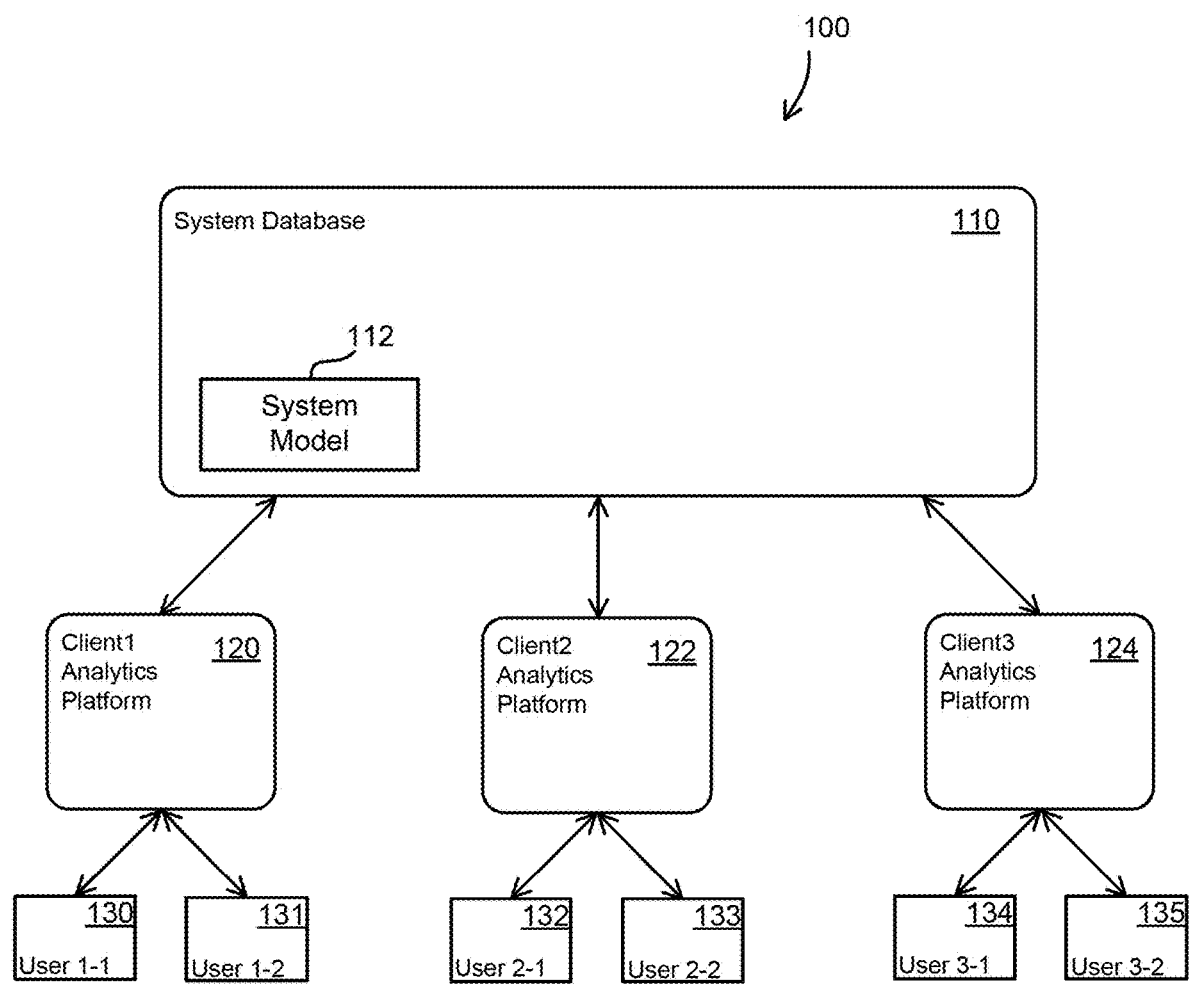
FIG. 1 is a schematic block diagram of an exemplary environment for the storage, management, and administration of social media data analytics in accordance with an exemplary embodiment.

FIG. 1 is a diagram that illustrates an exemplary environment 100 associated with the storage, management, and administration of data analytics in accordance with an exemplary embodiment. In particular, FIG. 1 depicts a simplified environment 100 having a system database 110, one or more client analytics platforms 120, 122, 124, and a number of user devices 130-135. Although not depicted in FIG. 1, the environment 100 may be deployed in the context of a multi-tenant application system, such as the system described below with reference to FIG. 9.

Generally, the system database 110 stores and administers access to a system model 112. In one exemplary embodiment, the system model 112 is a generic data analytics model for generating analytics data from social medial data. As discussed in greater detail below, the system model 112 may function to generate analytics data in the form of sentiment analysis.

Broadly, "analytics" may be considered the development of optimal or realistic decision recommendations or insights for a data set derived through the application of statistical models and analysis. In effect, the data analytics transform the collected data into new types of information that represent more than just a simple aggregation of the original data. As an example, analytics data may provide information about trends developing about a product or brand; like and dislikes about a product or brand; topics being discussed related to a product or brand; key product attributes; and demographics and social profile data of people discussing a product or brand.

The "social media data" may be considered any type of information associated with the content (e.g., a blog posting, newsfeed item, comment, etc.) or the person or group generating the content. The social media data may be in the form of publicly available sources of media or multimedia content, such as web content including text, audio, video, images or any combination thereof, and in some instances, the social media data may also include privately available media or multimedia content. Sources of social media data may include on-line publications by social media communities, such as blogospheres hosting various content, for example, web posts, articles, websites, consumer generated audio and/or videos, consumer generated images, or any other content. Specific examples of social media data sources include Facebook™, Pinterest™, Tumblr™, Google+™ Hootsuite™, and Twitter™.

The social media data may be analyzed based on entities (also referred to as topics, profiles, or keywords) extracted from the social media data that may be of interest to a user or client. Entities may represent such things as place names, company names, or product names. For example, social media statements analyzed about a travel destination may have identifiable entities for place names such as the destinations (Sao Paulo, Antigua, Barbados), or the companies (Sunwing, Travelocity, Expedia), and may reference activities or things (sailing, snorkeling, hiking). In one exemplary embodiment, the entities may be structured by keywords in a hierarchy of groups. A sample structure is provided below.

---

Topic Profile: "Coca-Cola" (
BRANDS keyword group:
(
    CONTAINS
        "New Coke"
        OR "Glass Bottle"
        OR "Recycling"
    AND CONTAINS
        "Coke"
        OR "Coca-cola"
        OR "Classic"
    AND DOES NOT CONTAIN
        "Cherry Coke"
        OR "Coke Zero"
)
AND COMPETITORS keyword group:
(
    CONTAINS
        "Pepsi-cola"
        OR "Pepsi"
        OR "Jolt"
        OR "Pepsi Clear"
    AND CONTAINS
        "Cola"
    AND DOES NOT CONTAIN
        "Sprite"
        OR "7-Up"
        OR "Fanta"
        OR "Gatoraid"
)
AND INDUSTRY keyword group:
(
    CONTAINS
        "Soda"
        OR "Pop"
    AND CONTAINS
        "Carbonated Beverage"
        OR "Soft Drinks"
    AND DOES NOT CONTAIN
        "Juice"
        OR "Milk"
)
AND FILTERED By:
(
    MEDIA TYPES
        "BLOGS"
        OR "MICROMEDIA"
        OR "VIDEOS"
    AND LANGUAGES
        "English"
        OR "Spanish"
        OR "French"
)

---

Generally, "sentiment analysis" or "sentiment analytics" refers to a field of data analytics that provides information about the inference or meaning of an entity derived from natural language processing of text to determine such things as tone, intent, subjects, or themes. In other words, an entity or topic may be evaluated with respect to positive sentiment, negative sentiment, and/or other sentiment characteristics.

As noted above, the system model 112 is suitable for generating sentiment attributes, scores, or values from social media data. The system model 112 may be based on training data in which sentiment attributes or values are assigned to statements or words that enable machine learning algorithms to build a framework for evaluating the data. As noted above, the system model 112 is a common model in which the same data will result in the same sentiment value, regardless of the client. This results in a limited utility of the system model 112 across multiple clients.

As described below, the client analytics platforms 120, 122, 124 provide a system for accessing and modifying the system model 112 to result in a sentiment analytics model personalized for the particular client. This enables a client to obtain more accurate data analytics, particularly more accurate sentiment values for a designated topic.

To provide an example of personalized sentiment, the social media comment "I love Coca-Cola" is clearly a positive comment from the perspective of Coca-Cola. However, this same comment may be perceived as a negative comment from the perspective of a competitor, such as Pepsi, because it implies that the customer prefers Coca-Cola products to those of Pepsi. In the more generic system model 112, it is likely that this comment would be considered a positive comment, regardless of the client. On the other hand, the client analytics platforms 120, 122, 124 enable a more nuanced, personalized analysis of the social media data, as described in greater detail below.

Each client analytics platform 120, 122, 124 may be associated with one or more user devices 130-135 that enable a user to interact within the environment 100. In general, a client may be a customer of the system database 110. In practice, the client may be an organization, company, or group of users with a common association. A number of different clients may share access to the system database 110, as demonstrated by the multiple client analytics platforms 120, 122, 124. In the embodiments discussed below, the client may be referred to as a "tenant" that shares resources with other tenants as part of a multi-tenant database system. In general, a user may be a person affiliated with the client, such as an employee or client customer desiring access to the data analytics resources of the environment 100. The devices 130-135 may be any sort of personal computer, mobile telephone, tablet or other network-enabled user device on a network for accessing the respective client analytics platform 120, 122, 124. FIG. 1 depicts three client analytics platforms 120, 122, 124, each with two user devices 130-135, in the environment 100. In practice, however, the system database 110 supports any number of different client analytics platforms 120, 122, 124, and the client analytics platforms 120, 122, 124 may support any number of user devices 130-135.

FIG. 1 depicts functional units that might be realized using, for example, one or more processors, a data processing engine, or other computer-implemented. In this regard, each of the devices 130-135, the client analytics platforms 120, 122, 124, and/or the system database 110 may represent, without limitation: a piece of hardware (such as a computer, a mobile electronic device, or any processor-based computing device); a functional, logical, or processing module of a piece of hardware; a software-based application that executes at a piece of hardware; or the like. In certain embodiments, the units may be realized as one more web-based applications, desktop applications, object-oriented scripts running on webpages, or the like, which are suitably designed to perform the various client module tasks, processes, and procedures described in more detail herein. Although the client analytics platforms 120, 122, 124, and/or the system database 110 are depicted as distinct elements, the elements could be realized as a single logical element, module, or hardware device. Additional details about the client analytics platforms 120, 122, 124 are provided below.

Figure 2:
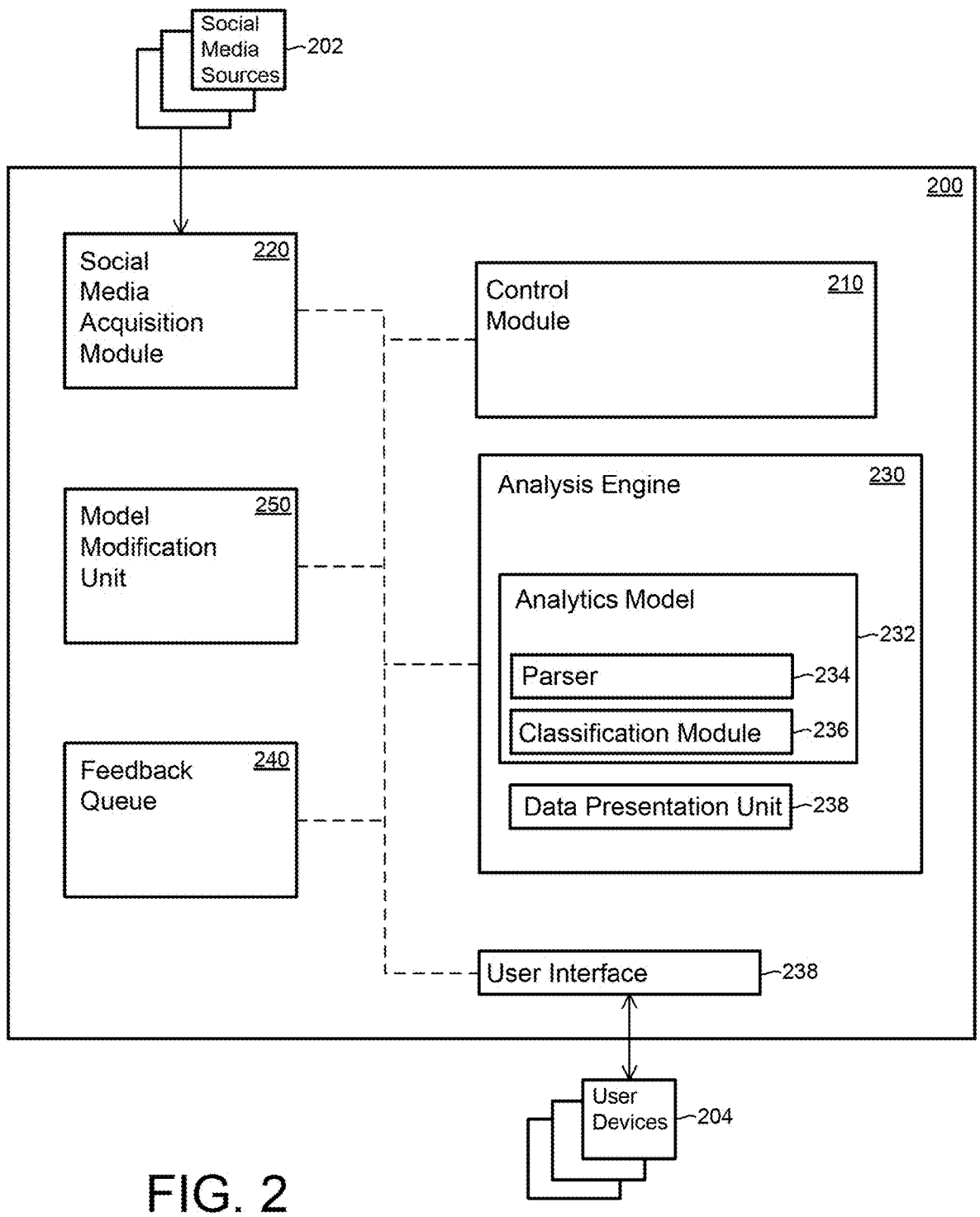
FIG. 2 is a schematic block diagram of a client analytics platform in accordance with an exemplary embodiment.

FIG. 2 is a more detailed block diagram of a client analytics platform 200 that may be accessed by one or more user devices 204 in accordance with an exemplary embodiment. In one exemplary embodiment, the client analytics platform 200 may correspond to one of the client analytics platform 120, 122, 124, and the user devices 204 may correspond to a respective user device 130-135 of FIG. 1. In general, the client analytics platform 200 collects social media data from one or more social media sources 202 and analyzes the social media data to produce social media analytics data. As described in greater detail below, the analytics data is generated by processing the social media data in accordance with an analytics model. More specific information regarding the processing of the social media data and the analytics model is discussed below.

The platform 200 includes a control module 210, a social media acquisition module 220, an analysis engine 230, a feedback queue 240, a model modification module 250, and a user interface 260. Each of the components 210, 220, 230, 240, 250, 260 of the platform 200 is introduced below in an overview prior to a more detailed description in subsequent sections. Although depicted separately in FIG. 2, one or more of the components 210, 220, 230, 240, 250, 260 may be integrated with one another or divided into additional submodules.

Although not shown in FIG. 2, the platform 200 may communicate with user devices 204 and social media sources 202 (as well as system database 110 of FIG. 1) in any suitable manner, including via a public network, Internet, a Public Switched Telephone Network (PSTN), a mobile network, or any other network providing connectivity. The components 210, 220, 230, 240, 250, 260 may be implemented with software running on a hardware platform, for example, a general purpose or specialized computer, including a processor, and a computer readable medium (e.g., a memory and other storage devices such as CD, DVD, hard disk drive, etc.) having instructions stored thereon that, upon execution by the processor, are capable of forming the various components 210, 220, 230, 240, 250, 260 of the platform 200.

In general, the control module 210 controls the interaction of the other system components 220, 230, 240, 250, 260, including providing the instructions and data to carry out the functions described below. The control module 210 includes a database 212 that stores at least some of the data associated with the platform 200 including data received from and provided to the other system components 220, 230, 240, 250, 260.

In one exemplary embodiment, the database 212 may store system configuration data, social media data, and analytics data. In general, each of the social media data and analytics data may be categorized as content documents or source documents. Data stored in the database 212 may further be stored according to providers, packages, types, subscriptions, and system configuration. The database 212 may be a document-based, non-hierarchical database. In one exemplary embodiment, the database 212 is a MongoDB system designed for horizontal scalability, although other distribution arrangements may be provided. For example, alternate embodiments may use a traditional hierarchical database and document indexing system The social media acquisition module 220 is configurable to receive instructions from the control module 210, including social media data requests originating from the user. The social media data requests may be in the form of topic profile requests. In response, the social media acquisition module 220 gathers data from social media sources 202 related to the requested topic profiles and stores the data as a collection of statements (or documents) in database 212

The analysis engine 230 is configurable to receive instructions from the control module 210 and to provide requested data in response to those instructions. As an example, the analysis engine 230 may receive social media data collected by the social media acquisition module 220 and generate social media data analytics in response.

As shown, the analysis engine 230 includes a client sentiment analytics model 232 and a data presentation unit 238. Generally, the client sentiment analytics model 232 includes a statement parser 234 and a classification module 236 that function to evaluate the social media data and generate a sentiment value, as described in greater detail below.

The statement parser 234 receives the social media documents, parses the social media documents into statements, and further parses the statements into elements organized into a form suitable for the classification module 236, as described in greater detail below. For example, the statement parser 234 may identify the base form of words; the parts of speech; names of companies, people, and the like; normalize dates, time, and numeric quantities; and identify structure of sentences in terms of phrases and word dependencies. As such, statements, fragments, and words may be assigned values individually, allowing for greater specificity and generalization. In one exemplary embodiment, the statement parser 234 may generate a parsed statement tree that allows sentiment to be calculated from the compositional values, thereby enabling direct and specific modifications that may be evaluated and re-evaluated.

The classification module 236 is an algorithm or system that functions to receive the data from the statement parser 234. In response, the classification module 236 functions to assign a value to the parsed elements, fragments, and statements, and based on respective relationships, generate a sentiment value for the elements, fragments, statements or collection of statements. The classification module 236 may assign any suitable type of classification to represent sentiment, such as very negative to very positive (e.g., (−−, +, ++), (−2, −1, 0, 1, 2), (0, 1 . . . 99, 100)). In one exemplary embodiment, the classification module 236 may be formed by a collection of sentiment data files, rules, dictionaries, and indices. Additional information about the client sentiment analytics model 232 is provided below.

In one exemplary embodiment, the statement parser 234 and/or classification module 236 may operate with a natural language analysis tool such as CoreNLP that receives raw text and extracts data or features associated with a topic or entity and determines a sentiment value. Additionally, statement parser 234 and/or classification module 236 may operate as a recursive neural network that structures a variable-length data set input and applies weights recursively to produce a prediction by traversing the structure in toplological order. For example, as described below, such a network provides phrase and sentence continuous representations based on word embedding to learn and relearn distributed representations of the structure. Additional examples of the client sentiment analytics model 232 are provided below.

Figure 3:
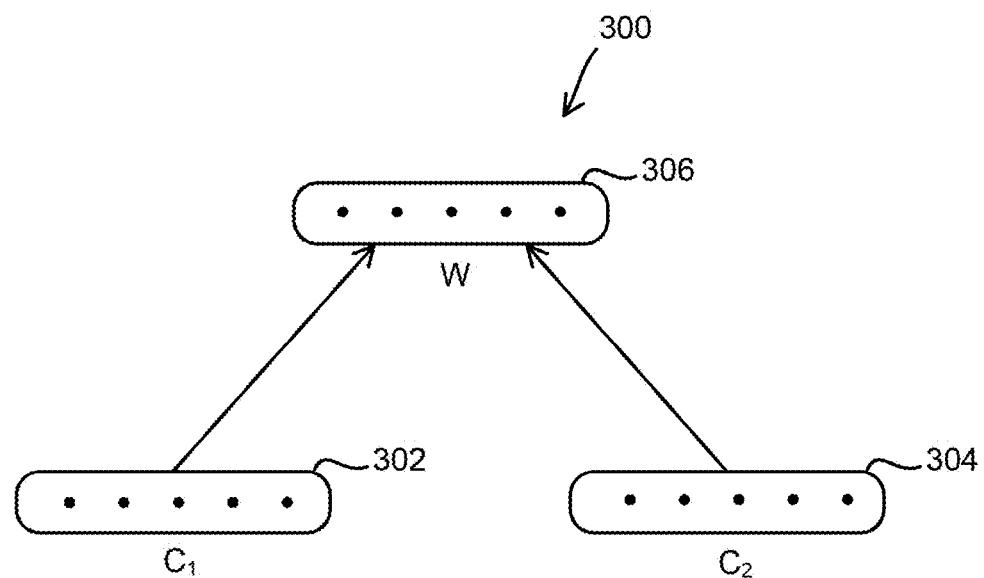
FIG. 3 is an exemplary tree structure architecture generated by the client analytics platform of FIG. 2 in accordance with an exemplary embodiment.

A brief example may be discussed with FIG. 3, which depicts an exemplary tree structure architecture generated by the client sentiment analytics model 232. A text string (or statement) that includes the set of words {C1, C2 . . . Cn} may be represented within a tree structure in which words are represented as base nodes (e.g., 302, 304) in the form of n-dimensional feature vectors that are combined to form higher level nodes (e.g., 306). As discussed above, the statement may by parsed into the tree structure by the parser 234. As shown, the words and segments of each statement are mapped into the semantic feature space represented by the tree nodes.

Each node may have a value that represents the sentiment assigned by the classification module 236. The values of nodes (e.g., 302, 304) may be combined in dependence on linked nodes to result in values for the higher order nodes 306. In effect, this enables the evaluation of words and phrases within the context and position of surrounding words and phrases, thereby providing a deep learning model in which the sentiment of a whole sentence is calculated based on the network structure of the compositional elements. As noted above, the nodes are recursively merged by the same neural network until they represent the entire statement. The structure of the client sentiment analytics model 232 jointly parses and represents the statements in a continuous vector space of features. As such, each element and combination of elements may be represented as a feature vector that reflects the element (or combination of elements) within the statement tree.

Returning to FIG. 2, in response to user requests, the data presentation unit 238 formats the sentiment value in a manner that may be presented to the user and/or stored in database 212. As an example and as discussed in greater detail below, the sentiment values may be presented to the user in a manner that displays the statement tree and associated compositional values. The user interface 260 may function to present this information to the user via user device 204, as discussed in greater detail below The feedback queue 240 receives user feedback regarding the sentiment values of generated by the analysis engine 230. The model modification module 250 receives the feedback from the feedback queue 240 and modifies the client sentiment analytics model 232 to reflect the modifications in the sentiment values. In one exemplary embodiment, the user feedback is in the form of extracted feature vectors from the data files modified by the user. The feature vectors may be extracted, for example, by CoreNLP. In response to the modified feature vectors, the model modification module 250 may modify data associated with the statement parser 234 and/or classification module 236 of the client sentiment analytics model 232. In one exemplary embodiment, the model modification module 250 may include or otherwise access a service such as VopalWabbit that functions to receive feature vectors and modify (or train or retrain) the values of the client sentiment analytics model 232. As additional feature vectors are modified and incorporated into the statement parser 234 and/or classification module 236, the results generated by the client sentiment analytics model 232 are further personalized. Further details about the user feedback are provided below.

The user interface 260 provides an interface or dashboard for the user to interact with the platform 200, including requesting, receiving, and interacting with social media data and social media analytics data. The user interface 260 may take one of a number of forms, including a dashboard interface, an engagement console, and other interfaces, such as a mobile interface or summary interface. As such, the user interface 260 provides a platform for the user to request social media data and social media analytics data from the platform 200. The user interface 260 further enables the user to modify the sentiment model 232 stored in the analysis engine 230. As an example, the user interface 260 may be a hosted software service accessible via an Internet web browser and function as a primary dashboard interface used by users to monitor, analyze, and engage social media data and social media analytics data. The user interface 260 allows the user to interact with data using screen-based objects referred to as the dashboard widgets.

Figure 4:
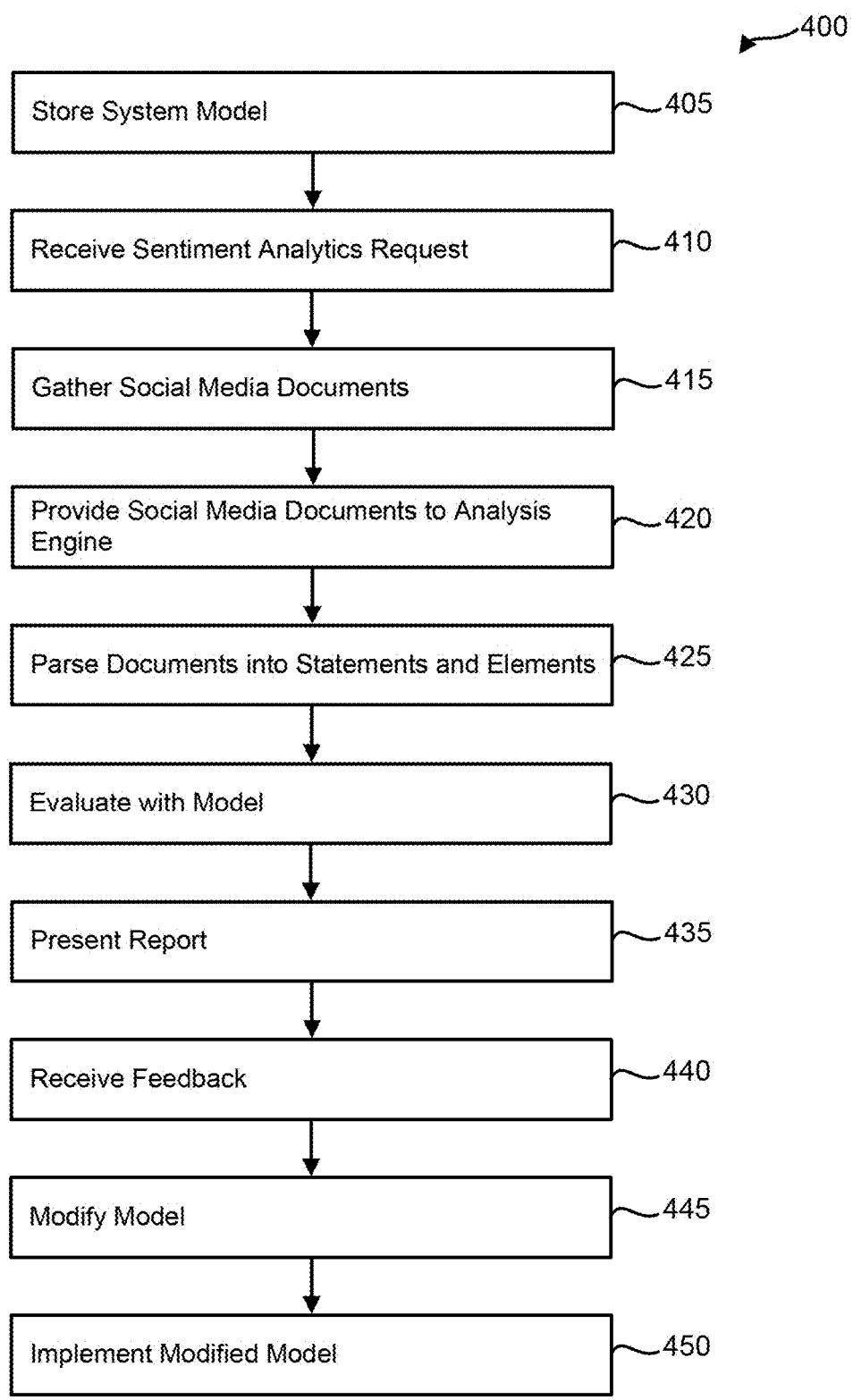
FIG. 4 is a flowchart of a method for administering and personalizing sentiment analysis in accordance with an exemplary embodiment.

In general and as described in greater detail below, the platform 200 operates as follows. Initially, the control module 210 receives or otherwise retrieves a sentiment model 112 from the system database 110 (FIG. 1). As noted above, the system model 112 provided by the system database 110 (FIG. 1) is a generic, non-client specific model, although the initial sentiment model is temporarily stored in the analysis engine 230 as client sentiment analytics model 232. During operation, a user may subscribe to a service of the platform 200 via the user interface 260 in which one or more topic profiles and analytics services are selected by the user. In accordance with the user requests, the social media acquisition module 220 retrieves social media data associated with the topic profile from the social media sources 202 and/or from social media data already stored in the database 212. The social media data is parsed by the statement parser 234 into a form suitable for the classification module 236. The classification module 236 analyzes the statement terms and generates an overall sentiment value. The overall sentiment value is presented to the user by the data presentation unit 238 via the user interface 260. In one exemplary embodiment, the analysis engine 230 may further generate sentiment value data that make up the overall sentiment value. In particular, the sentiment value data may include the values for statements, statement fragments, and individual words (or elements) presented to the user. Further, the user may provide feedback on these sentiment values in order to modify the client sentiment analytics model 232, and in effect, "personalize" subsequent sentiment analysis More details about the operation of the client analytics platform 200 of FIG. 2 within the context of the environment 100 of FIG. 1 are provided below with reference to FIG. 4. FIG. 4 is a flowchart of a method 400 for administering and personalizing sentiment analysis for social media data analytics in accordance with an exemplary embodiment. Sentiment analysis is discussed below, although further embodiments may be applicable to other types of data analytics.

The various tasks performed in connection with the method 400 may be performed by software, hardware, firmware, or any combination thereof. For illustrative purposes, the following description of the method 400 may refer to elements mentioned above in connection with FIGS. 1 and 2, which are referenced below. It should be appreciated that the method 400 may include any number of additional or alternative tasks, the tasks shown in FIG. 4 need not be performed in the illustrated order, and the method 400 may be incorporated into a more comprehensive procedure or process having additional functionality not described in detail herein. Moreover, one or more of the tasks shown in FIG. 4 could be omitted from an embodiment of the method 400 as long as the intended overall functionality remains intact.

In a first step 405, the control module 210 retrieves or otherwise receives a model 112 from the system database 110 and stores it as an sentiment analytics model 232 associated the analysis engine 230. Generally, as noted above, the system model 112 is generic with respect to all clients. Additionally, it should be noted this step is only necessary during initial implementation by a client or user. In other words, the system model 112 functions primarily as an initial model prior to personalization by the client, as described below in subsequent steps.

In a step 410, the control module 210 receives a sentiment analytics request from one of the user devices 204 via the user interface 260. Although not shown, the request may take any suitable form in which the topics or entities are selected, as well as the types or source of social media documents to be reviewed.

In a step 415, the control module 210 commands the social media acquisition module 220 to gather the social media documents from social media sources in accordance with the sentiment analytics request.

In a step 420, the social media acquisition module 220 provides the collected social media documents to the analysis engine 230. Additionally, the social media documents may be stored in a database 212.

In a step 425, the parser 234 of the analysis engine 230 receives the social media documents, identifies statements within the social media documents associated with the selected entity, and further parses the statements into component elements. In one exemplary embodiment, the parser 234 parses the statements into statement trees in which the relationships between elements are graphically defined for further processing. Additional information regarding the statement trees is provided below.

In a step 430, the data from the statement parser 234 is evaluated in view of the classification module 236. In particular, the classification module 236 assigns a value to each statement, as well as each element and fragment that make up the statement, to reflect a compositional arrangement of sentiment values.

In a step 435, the data presentation unit 238 presents a report of the sentiment values to the user via the user interface 260 on the user devices 204. As described below, the report enables the user to view the overall sentiment value of the collected social media statements and the sentiment values for the statement elements and fragments extracted from the social media documents.

Figure 5:
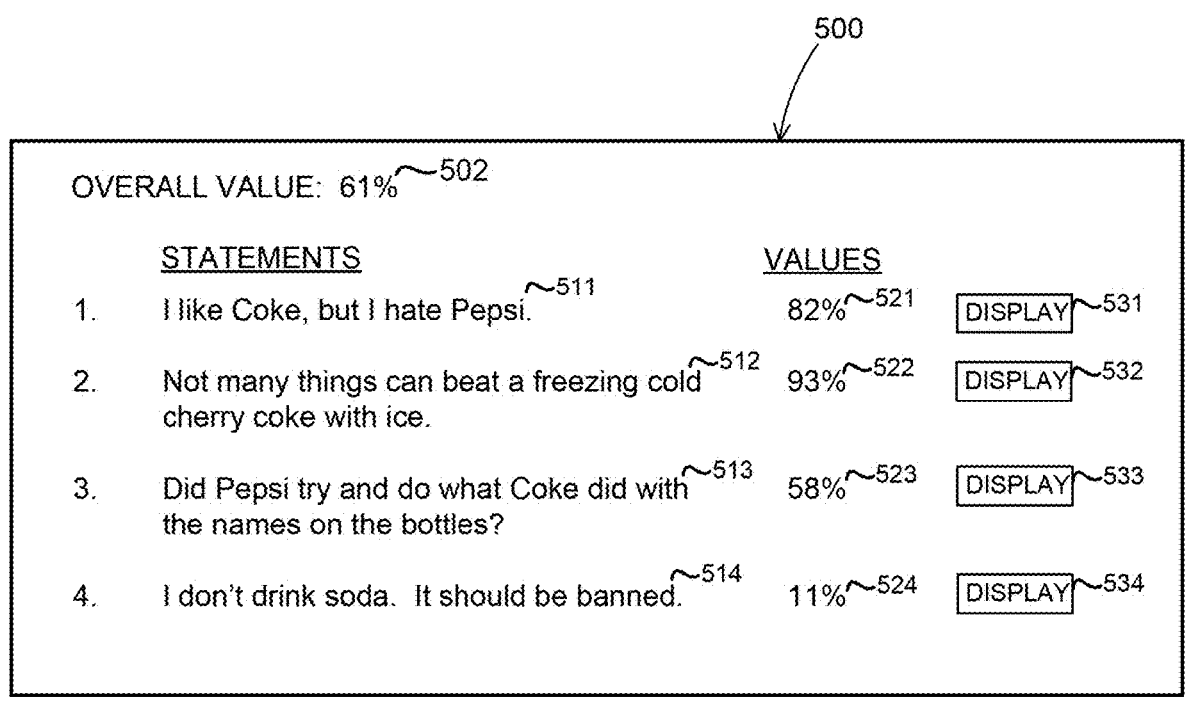
FIG. 5 is a sample report generated by the client analytics platform of FIG. 2 in accordance with an exemplary embodiment.

Reference is briefly made to FIG. 5, which is an exemplary report 500 of the sentiment analysis rendered by the platform 200 of FIG. 2. FIGS. 1 and 2 are also referenced below. As shown, the report 500 includes the collection of statements 511, 512, 513, 514 that have been extracted from the social media data. Collectively, the statements 511, 512, 513, 514 have a sentiment value 502 that represents the overall sentiment. In this particular embodiment, a sentiment value 502 of greater than 50% is a "positive" sentiment in that the topic has a favorable reputation or impression, and a sentiment value 502 of less than 50% is a "negative" sentiment in that the topic has an unfavorable reputation or impression. The more positive or negative the statement, the respectively higher or lower the value. In this particular example, the report is generated with respect to the "Coke" brand and has an overall sentiment value is 61%, thereby indicating a generally positive sentiment. Any suitable scoring or value scheme may be utilized. Since sentiment is subjective with respect to the user or client, the values may be modified or personalized to provide more applicable sentiment evaluation for the respective user, as described below in subsequent steps.

The report 500 further includes a sentiment value 521, 522, 523, 524 for each of the statements 511, 512, 513, 514 that represents the contribution of the respective statement to the overall value 502. Accordingly, rather than merely providing the user with an overall score, the report 500 of the platform 200 enables to user to view the sentiment values individual statements.

Returning to the method of FIG. 4, in a step 440, the user interface 260 may receive feedback regarding the sentiment values from the user via the user devices 204 and/or provide more detailed information regarding the statements 511-514.

Referring again to FIG. 5, the report 500 additionally includes a display icon 531, 532, 533, 534 associated with each of the statements 511, 512, 513, 514. The display icons 531, 532, 533, 534 function as widgets or interactive elements that enable a user to obtain additional information regarding the respective statement.

Figure 6:
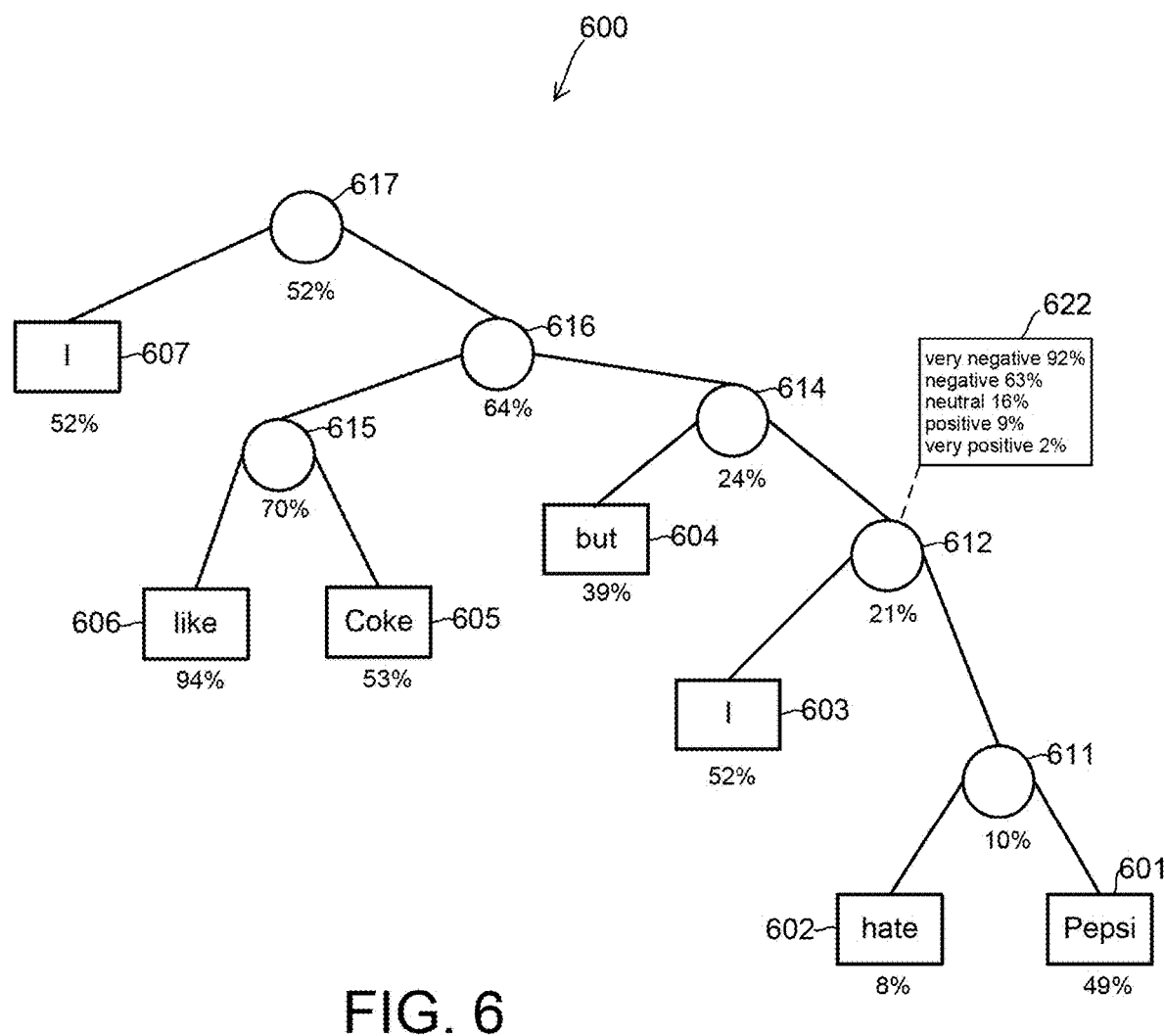
FIGS. 6-8 are sample statement trees generated by the client analytics platform of FIG. 2 in accordance with exemplary embodiments.

For example, upon selection of icon 531, the user interface 260 of the platform 200 may present a statement tree to the user on the user device. As one example, FIG. 6 is a statement tree 600 in accordance with an exemplary embodiment, although other formats or presentation schemes may be presented. In the exemplary embodiment of FIG. 6, the statement tree 600 is associated with statement 511 of FIG. 5 such that, upon selection of icon 531, the statement tree 600 is presented to the user.

As shown in FIG. 6, the statement tree 600 is in the form of a diagram of elements (or nodes) 601-607 that are connected at higher level nodes 611-617. Each element 601-607 corresponds to a word in the statement and the nodes 611-617 correspond to a statement fragment (or collection of elements) to provide context for the relationship between elements and groups of elements. Each element 601-607 may be provided with a sentiment value, and the nodes 611-617 have a calculated sentiment value based on the hierarchical structure of elements 601-607.

As such, a sentiment value is provided for each element 601-607 and each combination of elements at nodes 611-617. For example, from the neutral perspective (e.g., neither Coke, nor Pepsi), the term "Pepsi" in element 601 may carry a relatively neutral or possibly positive sentiment, while the term "hate" is clearly a negative sentiment. Each of these elements 601, 602 may be assigned different sentiment values. Node 611 indicates that the term "hate" in element 602 is directed to the term "Pepsi" in element 601, and as such, node 611 represents the collection (or fragment) of elements 601, 602. Accordingly, node 611 has a sentiment value that is a function of the sentiment values of elements 601, 602. Similarly, each of the remaining elements 603-607 has a sentiment value, and the remaining nodes 612-617 have sentiment values that are functions of the underlying elements.

In one exemplary embodiment, additional information may be provided about the sentiment values in the form of a more granulated or detailed breakdown of a respective value. For example, a pop-up or dialog box 622 that provides the sentiment value in the form of percentage classification (e.g., very negative/negative/neutral/positive/very positive). The dialog box 622 may be activated, for example, by hovering a cursor or other user input device element over node 612 or selecting the node 612. This information could provide additional insight for an element or node. As an example, an element or node may have a generally neutral sentiment value that could indicate a highly neutral classification or a generally high classifications for both very negative and very positive, thereby indicating whether or not people have strong opinions (although evenly split) on a topic or are generally apathetic.

In this example, node 617 represents the sentiment value of the entire statement. Accordingly, based on the presentation of statement tree 600, the user may understand the how the sentiment score for a particular statement is determined.

Additionally, in one exemplary embodiment, the statement tree 600 provides a mechanism for modifying the sentiments values of the nodes 611-617 and elements 601-607 that make up that statement, and thus, modify the sentiment value of the statement, as well as the overall sentiment score for a collection of statements. In particular, the user interface 260 presents the statement tree 600 with interactive elements that enable the user to select an element (e.g., any one or more of elements 601-607) or node (e.g., any one or more of nodes 611-617) and adjust the associated sentiment value. For example, the user may view the statement fragment represented by node 612 corresponding to "I hate Pepsi". Presently, node 612 has a negative sentiment value that reflects the determination by the sentiment analytics model that the fragment "I hate Pepsi" is negative. The negative sentiment value at node 612 functions to reduce the sentiment value of the overall statement, e.g., because the sentiment value of node 617 is a function of the value of node 616, which is a function of the value of node 614, which is a function of the value of node 612.

However, from the perspective of a client that is a competitor of Pepsi, such as Coca-Cola, the fragment "I hate Pepsi" may have a positive sentiment in that it may suggest that the person prefers another drink, such as Coke. As such, the client may determine that the present sentiment value of this fragment at node 612 does not accurately reflect the actual sentiment of the author of the statement with respect to the relevant topic (e.g., Coke), which could lead to inaccuracies in the sentiment value of the statement and the overall sentiment value. In such a situation, the client may modify the sentiment value.

Figure 7:
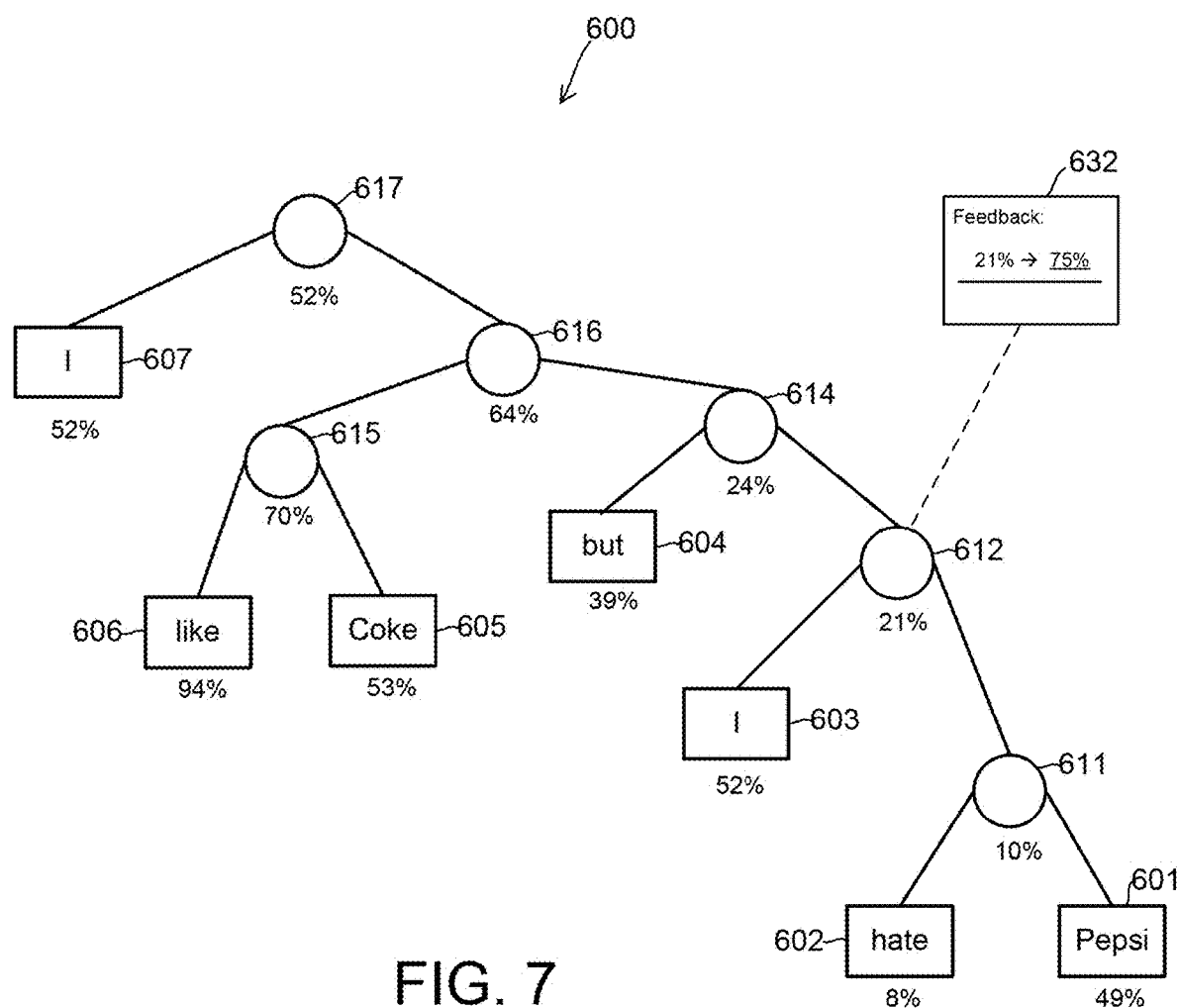

Continuing with this example, reference is made to FIG. 7, which generally corresponds to the elements (or nodes) 601-607 and nodes 611-617 of FIG. 6 in which the user has selected an interactive element associated with node 612, and upon activation, a pop-up or dialog entry field 632 may be presented. The entry field 632 enables the user to select or enter a different sentiment value for this node 612 that will override the collective sentiment values of the combination of elements 601-603. As noted above, if the user considers the current sentiment value to be too negative, the user will increase the sentiment value. These modifications to sentiment values may form feedback for the client platform 200.

FIG. 7 depicts one exemplary mechanism of providing sentiment feedback. Other mechanisms may be provided, including thumb up/down symbology, icons representing a spectrum of feedback, and the like. As a result, a user may set these values to reflect more accurate preferences on the content. These exemplary embodiments enable a user to review a statement or a series of statements and browse through to adjust sentiment values "on the fly". Upon completion, the sentiment feedback may be in the form of updated (or tagged) statements, fragments, and/or words created from the present model with feedback data from the user.

Returning to the method 400 of FIG. 4, in step 440, the feedback received from the user (e.g., the updated sentiment values modified by the user) may be provided to the feedback queue 240. In one exemplary embodiment, the feedback queue 240 may function to receive the feedback from a respective client in a system in which a number of clients share system resources, such as in the multi-tenant database system discussed below. As a result of this arrangement, the feedback from one client is not applicable to other clients.

In a step 445, the model modification module 250 receives the feedback from the feedback queue 240 and modifies the sentiment analytics model 232 of the analysis engine 230. In one exemplary embodiment, the model modification module 250 may update the sentiment values for particular elements, statement fragments, or statements based on the modifications from the client.

Using the example discussed above in reference to FIGS. 6 and 7, the model modification module 250 may adjust the sentiment analytics model 232 to increase the sentiment value for the fragment "I hate Pepsi" and similar statements.

In one exemplary embodiment, the model modification module 250 may be in the form of machine learning program such as Vowpal Wabbit that appropriately retrains or updates the sentiment values that make up the sentiment analytics model 232. As noted above, the statement parser 234 may function using CoreNLP that generates a parsed statement structure that allows for the calculation of compositional sentiment values from individual statements, fragments, and words, thereby enabling direct and specific modifications that may be evaluated and re-evaluated.

In a step 450, the analysis engine 230 implements the modified sentiment analytics model 232 to update the sentiment values of the social media statements presently being considered, if applicable, and/or implement the modified sentiment analytics model 232 for considering further or additional social media statements.

Figure 8:
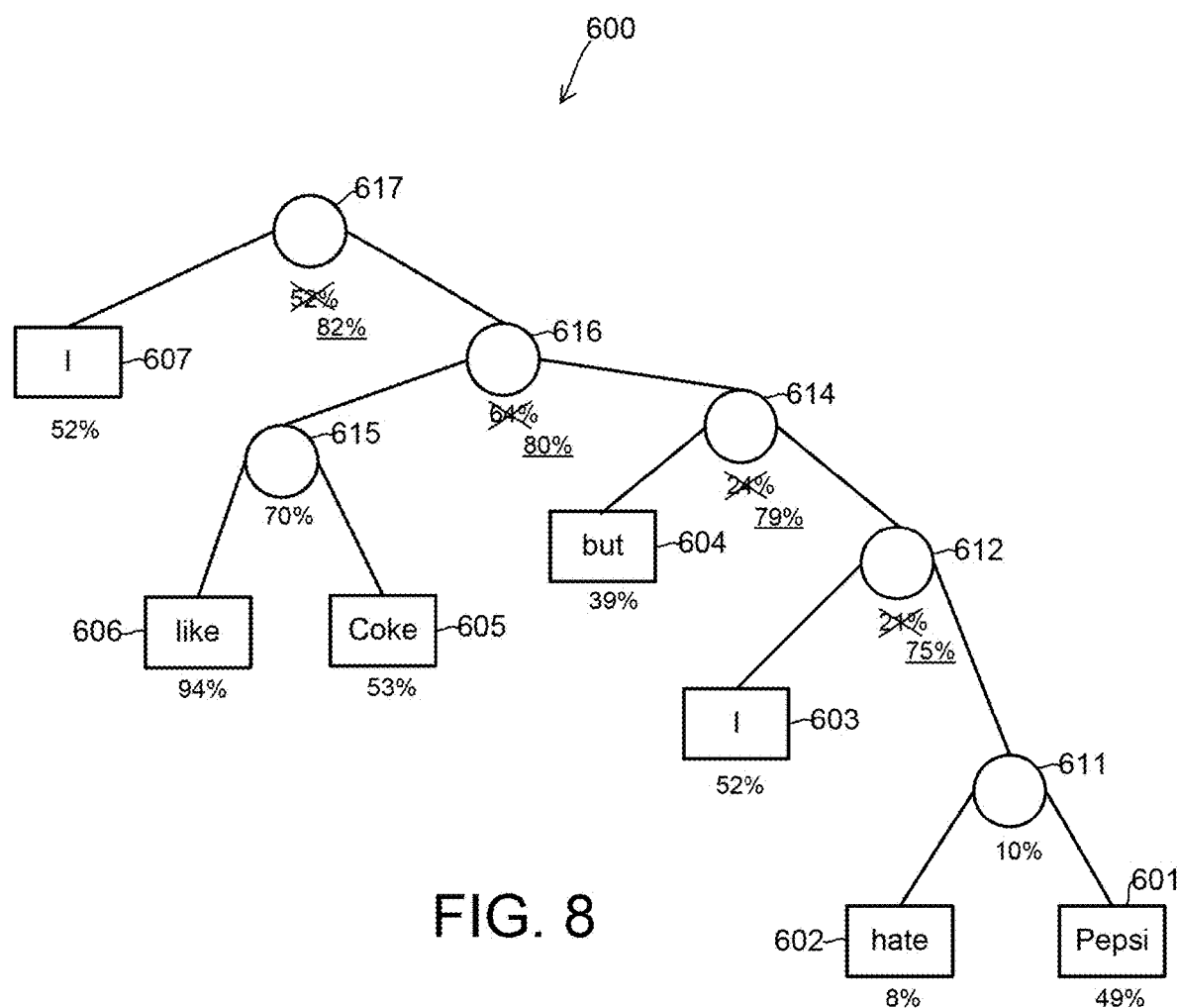

The result of the feedback is depicted in FIG. 8, which generally corresponds to the elements (or nodes) 601-607 and nodes 611-617 of FIG. 6 upon completion of the modification depicted in FIG. 7. The sentiment values in FIG. 8 reflect the recalculated values in view of the modification. In one exemplary embodiment, the updated values of nodes 601-607 and nodes 611-617 may be provided in a manner that indicates the modification relative to the previous values. As shown in FIG. 8, modification of node 612 also modifies the values of nodes 614, 616, 617. The results of this modification is a more positive sentiment value, which more accurately reflects the subjective sentiment of the user. In effect, this feedback functions to retrain the sentiment analytics model 232 to more closely match the preferences of the user or client. As a result of this modification, the platform 200 in effect "learns" the subjectivity of the user or client such that subsequent instances of similar language will have higher (or otherwise more accurate) sentiment values.

Accordingly, the updated sentiment analytics model 232 better reflects the context and true sentiment value from the perspective of the client to provide more meaningful sentiment analysis. As a result of this arrangement, different clients (e.g., client analytics platforms 120, 122, 124 of FIG. 1) may have different sentiment values for the same statements, fragments, and words, even though the original system model 112 (FIG. 1) was common to all clients.

Figure 9:
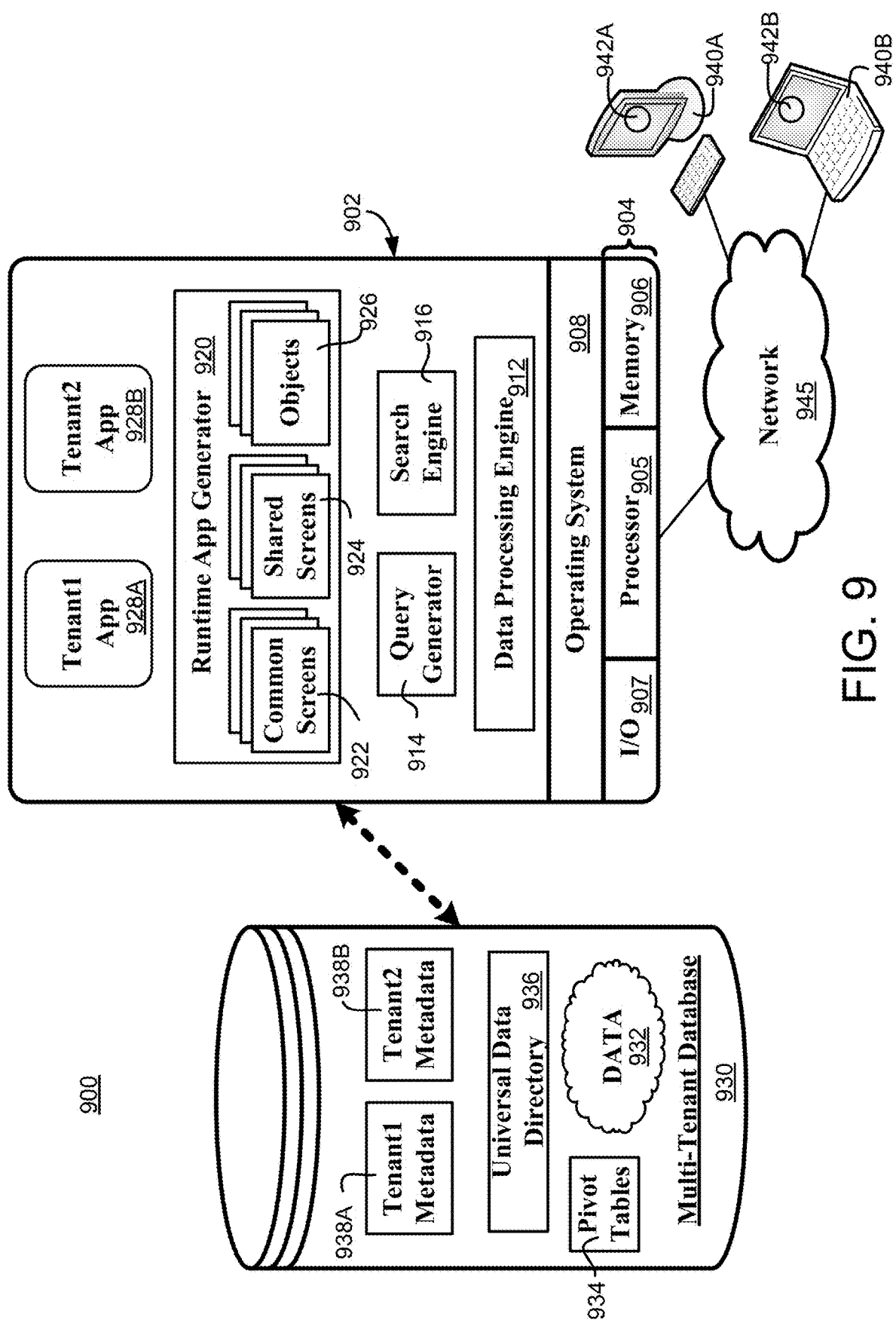
FIG. 9 is a block diagram of an exemplary multi-tenant application system that may implement the platform of FIG. 2 and the method of FIG. 4 in accordance with an exemplary embodiment.

In some exemplary embodiments, the systems and methods described above may be implemented in a multi-tenant application system, such as the multi-tenant application system 900 illustrated in FIG. 9. Referring to FIG. 9, an exemplary multi-tenant application system 900 suitably includes a server 802 that dynamically creates virtual applications 928A-B based upon data 932 from a common database 930 that is shared between multiple tenants. Data and services generated by the virtual applications 928A-B are provided via network 945 to any number of client devices 940A-B, as desired. Each virtual application 928A-B is suitably generated at run-time using a common platform 910 that securely provides access to data 932 in database 930 for each of the various tenants subscribing to system 900. As examples, the virtual applications 928A-B may correspond to one or more of the platforms 120, 122, 124, 200 discussed above, and devices 940A-B may correspond to one or more of the devices 130-135 discussed above.

A "tenant" or "organization" generally refers to a group of users that shares access to common data within database 930. Tenants may represent customers, customer departments, business or legal organizations, and/or any other entities that maintain data for particular sets of users within system 900. Using the examples above, a tenant may correspond to a client. Although multiple tenants may share access to a common server 902 and database 630, the particular data and services provided from server 902 to each tenant can be securely isolated from those provided to other tenants, as described more fully below. The multi-tenant architecture therefore allows different sets of users to share functionality without necessarily sharing each other's data 932.

Database 930 is any sort of repository or other data storage system capable of storing and managing data 932 associated with any number of tenants. Database 930 may be implemented using any type of conventional database server hardware. In various embodiments, database 930 shares processing hardware 904 with server 902. In other embodiments, database 630 is implemented using separate physical and/or virtual database server hardware that communicates with server 902 to perform the various functions described herein. In an exemplary embodiment, the database 930 includes a database management system or other equivalent software capable of determining an optimal query plan for retrieving and providing a particular subset of the data 932 to an instance of virtual application 928 in response to a query initiated or otherwise provided by a virtual application 928. The multi-tenant database 930 may alternatively be referred to herein as an on-demand database, in that the multi-tenant database 930 provides (or is available to provide) data at run-time to on-demand virtual applications 928 generated by the application platform 910.

Data 932 may be organized and formatted in any manner to support multi-tenant application platform 910. In various embodiments, data 932 is suitably organized into a relatively small number of large data tables to maintain a semi-amorphous "heap"-type format. Data 932 can then be organized as needed for a particular virtual application 928A-B. In various embodiments, conventional data relationships are established using any number of pivot tables 934 that establish indexing, uniqueness, relationships between entities, and/or other aspects of conventional database organization as desired.

Further data manipulation and report formatting is generally performed at run-time using a variety of meta-data constructs. Metadata within a universal data directory (UDD) 936, for example, can be used to describe any number of forms, reports, workflows, user access privileges, business logic and other constructs that are common to multiple tenants. Tenant-specific formatting, functions and other constructs may be maintained as tenant-specific metadata 938A-B for each tenant, as desired. Rather than forcing data 932 into an inflexible global structure that is common to all tenants and applications, then, database 930 is organized to be relatively amorphous, with tables 934 and metadata 936-938 providing additional structure on an as-needed basis. To that end, application platform 910 suitably uses tables 934 and/or metadata 936, 938 to generate "virtual" components of applications 928A-B to logically obtain, process, and present the relatively amorphous data 932 from database 930.

Server 902 is implemented using one or more actual and/or virtual computing systems that collectively provide a dynamic application platform 910 for generating virtual applications 928A-B. Server 902 operates with any sort of conventional computing hardware 904, such as any processor 905, memory 906, input/output features 907 and the like. Processor 905 may be implemented using one or more of microprocessors, microcontrol modules, processing cores and/or other computing resources spread across any number of distributed or integrated systems, including any number of "cloud-based" or other virtual systems. Memory 906 represents any non-transitory short or long term storage capable of storing programming instructions for execution on processor 905, including any sort of random access memory (RAM), read only memory (ROM), flash memory, magnetic or optical mass storage, and/or the like. Input/output features 907 represent conventional interfaces to networks (e.g., to network 945, or any other local area, wide area or other network), mass storage, display devices, data entry devices and/or the like. The computer-executable programming instructions, when read and executed by the server 902 and/or processor 905, cause the server 902 and/or processor 905 to create, generate, or otherwise facilitate the application platform 910 and/or virtual applications 928 and perform one or more additional tasks, operations, functions, and/or processes described herein. It should be noted that the memory 906 represents one suitable implementation of such computer-readable media, and alternatively or additionally, the server 902 could receive and cooperate with external computer-readable media that is realized as a portable or mobile component or application platform, e.g., a portable hard drive, a USB flash drive, an optical disc, or the like. In a typical embodiment, application platform 910 gains access to processing resources, communications interfaces and other features of hardware 904 using any sort of conventional or proprietary operating system 908. As noted above, server 902 may be implemented using a cluster of actual and/or virtual servers operating in conjunction with each other, typically in association with conventional network communications, cluster management, load balancing and other features as appropriate.

Application platform 910 is any sort of software application or other data processing engine that generates virtual applications 928A-B that provide data and/or services to client devices 940A-B. Virtual applications 928A-B are typically generated at run-time in response to queries received from client devices 940A-B. In the example illustrated in FIG. 9, application platform 910 includes a bulk data processing engine 912, a query generator 914, a search engine 916 that provides text indexing and other search functionality, and a runtime application generator 920. Each of these features may be implemented as a separate process or other module, and many equivalent embodiments could include different and/or additional features, components or other modules as desired.

Runtime application generator 920 dynamically builds and executes virtual applications 928A-B in response to specific requests received from client devices 940A-B. Virtual applications 928A-B created by tenants are typically constructed in accordance with tenant-specific metadata 938, which describes the particular tables, reports, interfaces and/or other features of the particular application. In various embodiments, each virtual application 928A-B generates dynamic web content that can be served to a browser or other client program 942A-B associated with client device 940A-B, as appropriate. Data processing engine 912 performs bulk processing operations on data 932 such as uploads or downloads, updates, online transaction processing and/or the like.

The runtime application generator 920 suitably interacts with the query generator 914 to efficiently obtain multi-tenant data 932 from the database 930 as needed in response to input queries initiated or otherwise provided by users of the client devices 940. In a typical embodiment, the query generator 914 considers the identity of the user requesting a particular function (along with the user's associated tenant), and then builds and executes queries to the database 930 using system-wide metadata 936, tenant specific metadata 938, pivot tables 934, and/or any other available resources. The query generator 914 in this example therefore maintains security of the common database 930 by ensuring that queries are consistent with access privileges granted to the user and/or tenant that initiated the request. In this manner, the query generator 914 suitably obtains requested subsets of data 932 accessible to a user and/or tenant from the database 930 as needed to populate the tables, reports or other features of the particular virtual application 928 for that user and/or tenant. Still referring to FIG. 9, the data processing engine 912 performs bulk processing operations on the data 932 such as uploads or downloads, updates, online transaction processing, and/or the like. In many embodiments, less urgent bulk processing of the data 932 can be scheduled to occur as processing resources become available, thereby giving priority to more urgent data processing by the query generator 914, the search engine 916, the virtual applications 928, etc.

Data and services provided by server 902 can be retrieved using any sort of personal computer, mobile telephone, tablet or other network-enabled client device 940 on network 945. Typically, the user operates a conventional browser or other client program 942 to contact server 902 via network 945 using, for example, the hypertext transport protocol (HTTP) or the like. The user typically authenticates his or her identity to the server 902 to obtain a session identification ("SessionID") that identifies the user in subsequent communications with server 902. When the identified user requests access to a virtual application 928, application generator 920 suitably creates the application at run time based upon metadata 936 and 938, as appropriate. Query generator 914 suitably obtains the requested data 932 from database 930 as needed to populate the tables, reports or other features of virtual application 928. As noted above, the virtual application 928 may contain Java, ActiveX or other content that can be presented using conventional client software 942 running on client device 940; other embodiments may simply provide dynamic web or other content that can be presented and viewed by the user, as desired.

Generally speaking, the various functions and features described above may be carried out with any sort of hardware, software and/or firmware logic that is stored and/or executed on any platform. Some or all aspects of exemplary embodiments may be carried out, for example, by logic executing within platform 910 in FIG. 9, for example, using software or firmware logic that is stored in memory and executed by processor as part of application platform. The particular hardware, software and/or firmware logic may vary from context to context, implementation to implementation, and embodiment to embodiment in accordance with the various features, structures and environments set forth herein. The particular means used to implement each of the various functions may be any sort of processing structures that are capable of executing software and/or firmware logic in any format, and/or any sort of application-specific or general purpose hardware, including any sort of discrete and/or integrated circuitry.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configurable to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIGS. 1-9 depicts exemplary arrangements of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for processing social media data, comprising: a computer, having a processor and a computer readable storage medium storing computer readable instructions capable of, upon execution by the processor, forming a platform comprising:
   a control module configurable to:
      receive, from a database, a generic non-client specific sentiment model for generating analytics data from social media data; and
      receive a sentiment analytics request, from a client user via a user device, that identifies one or more selected entities;
   a social media acquisition module configurable to collect social media documents from social media sources in accordance with the sentiment analytics request;
   an analysis engine configurable to:
      identify a plurality of social media statements within the social media documents associated with the one or more selected entities;
      analyze the plurality of social media statements according to a generic non-client specific sentiment model for generating analytics data from social media data;
      generate a first statement tree for each respective social media statement based on the results from the analysis of the social media statements according to the generic non-client specific sentiment model, each first statement tree formed by a plurality of nodes representing elements of its respective social media statement and including a respective sentiment value associated with each of the plurality of nodes, the sentiment value for each node generated from the analyzing the plurality of social media statements according to the generic non-client specific sentiment model; and
      present the first statement tree for each of the social media statements for display to a client user, including a display of the respective sentiment value associated with each of the plurality of nodes;
   a feedback queue configurable to receive feedback from the client user on at least a portion of the sentiment values, the feedback including an identification of a node from the first statement tree and an adjusted sentiment value for the identified node;
   a model modification module configurable to modify the generic non-client specific sentiment model based on the feedback to result in a modified sentiment model, wherein at least one of the sentiment values associated with the plurality of nodes is modified; and
   a database configurable to store the modified sentiment model as a personalized client-specific sentiment model for the client user.

2. The system of claim 1, wherein:
   the analysis engine is configurable to:
      analyze the plurality of social media statements according to the personalized client-specific sentiment model;
      generate a second statement tree for each respective social media statement based on the results from the analysis of the social media statements according to the personalized client-specific sentiment model, each second statement tree formed by a plurality of nodes representing elements of its respective social media statement and including a respective sentiment value associated with each of the plurality of nodes; and
      present the second statement tree for each respective social media statement for display to the client user, including a display of the respective sentiment value associated with each of the plurality of nodes;
   the feedback queue is configurable to receive further feedback from the client user on at least a further portion of the sentiment values, the feedback including an identification of a node from a statement tree and an adjusted sentiment value for the identified node;
   the model modification model is configurable to modify the personalized client-specific sentiment model based on the further feedback to result in a further modified sentiment model, wherein at least one of the sentiment values associated with the plurality of nodes is modified; and
   the database is configurable to store the further modified sentiment model as the personalized client-specific sentiment model for the client user.

3. The system of claim 1, wherein the analysis engine is configurable to present data from the first statement tree for each respective social media statement as a report listing the sentiment value associated with each of the plurality of nodes.

4. The system of claim 1, wherein the feedback queue is configurable to receive the feedback in the form of a feature vector for each of the plurality of nodes that has been modified.

5. The system of claim 4, wherein the analysis engine comprises a parser configurable to parse each of the social media statements and a classification module configurable to classify each of the elements with the respective sentiment value.

6. The system of claim 1, wherein the analysis engine is configurable to apply the generic non-client specific model as a recursive neural network.

7. The system of claim 1, wherein the generic non-client specific model is a basic sentiment model received from an analysis provider.

8. A computer implemented method for providing a personalized client-specific sentiment model for online social network analysis, the method comprising:

receiving, from a database, a generic non-client specific sentiment model for generating analytics data from social media data;

receiving a sentiment analytics request, from a client user via a user device, that identifies one or more selected entities;

collecting social media documents from social media sources in accordance with the sentiment analytics request;

identifying a plurality of social media statements within the social media documents associated with the one or more selected entities;

analyzing the plurality of social media statements according to the generic non-client specific sentiment model;

generating a statement tree for each respective social media statement based on the results from the analysis of the social media statements according to the generic non-client specific sentiment model, each statement tree formed by a plurality of nodes representing elements of its respective social media statement and including a respective sentiment value associated with each of the plurality of nodes, the sentiment value for each node generated from the analyzing the plurality of social media statements according to the generic non-client specific sentiment model;

presenting the statement tree for each of the social media statements for display on the user device to the client user, including displaying, for each statement tree, the respective sentiment value associated with each of the plurality of nodes;

receiving, via the user device, feedback from the client user on at least a portion of the sentiment values, the feedback including an identification of a node from the statement tree and an adjusted sentiment value for the identified node;

modifying the generic non-client specific sentiment model based on the feedback to result in a modified sentiment model, wherein the modifying includes modifying at least one of the sentiment values associated with the plurality of nodes; and storing the modified sentiment model as the personalized client-specific sentiment model for the client user.

9. The computer implemented method of claim 8, further comprising:

analyzing the plurality of social media statements according to the personalized client-specific sentiment model;

generating a second statement tree for each respective social media statement based on the results from the analysis of the social media statements according to the personalized client-specific sentiment model, each second statement tree formed by a plurality of nodes representing elements of its respective social media statement and including a respective sentiment value associated with each of the plurality of nodes;

presenting, on the user device, the second statement tree for each respective social media statement for display to the client user, including a display of the respective sentiment value associated with each of the plurality of nodes;

receiving, via the user device, further feedback from the client user on at least a further portion of the sentiment values, the feedback including an identification of a node from a statement tree and an adjusted sentiment value for the identified node;

modifying the personalized client-specific sentiment model based on the further feedback to result in a further modified sentiment model, wherein at least one of the sentiment values associated with the plurality of nodes is modified; and storing the further modified sentiment model as the personalized client-specific sentiment model for the client user.

10. The computer implemented method of claim 8, wherein the presenting step includes presenting data from the first statement tree for each respective social media statement as a report listing the sentiment value associated with each of the plurality of nodes.

11. The computer implemented method of claim 8, wherein the receiving step includes receiving the feedback in the form of a feature vector for each of the plurality of nodes that has been modified.

12. The computer implemented method of claim 11, wherein the analyzing step includes parsing each of the social media statements and classifying each of the elements with the respective sentiment value.

13. The computer implemented method of claim 8, wherein the analyzing step includes applying the generic non-client specific sentiment model as a recursive neural network.

14. The computer implemented method of claim 8, further comprising receiving the generic non-client specific sentiment model as a basic sentiment model from an analysis provider.

15. A client analytics platform configured to provide a personalized client-specific sentiment analytics model for generating analytics data from social media data, the platform comprising one or more processors configured by programming instructions on non-transient computer readable media, the platform configured by the programming instructions to:

receive, from a database, a generic non-client specific sentiment model for generating analytics data from social media data;

receive a sentiment analytics request, from a client user via a user device, that identifies one or more selected entities;

collect social media documents from social media sources in accordance with the sentiment analytics request;

identify a plurality of social media statements within the social media documents associated with the one or more selected entities;

analyze the plurality of social media statements according to the generic non-client specific sentiment model;

generate a statement tree for each respective social media statement based on the results from the analysis of the social media statements according to the generic non-client specific sentiment model, each statement tree formed by a plurality of nodes representing elements of its respective social media statement and including a respective sentiment value associated with each of the plurality of nodes, the sentiment value for each node generated from the analyzing the plurality of social media statements according to the generic non-client specific sentiment model;

cause the statement tree for each of the social media statements to be displayed on the user device to a client user, the display including, for each statement tree, the respective sentiment value associated with each of the plurality of nodes;

receive feedback from the client user on at least a portion of the sentiment values, the feedback including an identification of a node from the statement tree and an adjusted sentiment value for the identified node;

modify the generic non-client specific sentiment model based on the feedback to result in a modified sentiment model, wherein at least one of the sentiment values associated with the plurality of nodes is modified; and store the modified sentiment model as the personalized client-specific model for the client user.

16. The client analytics platform of claim 15, further configurable to:

analyze the plurality of social media statements according to the personalized client-specific sentiment model;

generate a second statement tree for each respective social media statement based on the results from the analysis of the social media statements according to the personalized client-specific sentiment model, each second statement tree formed by a plurality of nodes representing elements of its respective social media statement and including a respective sentiment value associated with each of the plurality of nodes;

present, on the user device, the second statement tree for each respective social media statement for display to the client user, including a display of the respective sentiment value associated with each of the plurality of nodes;

receive, via the user device, further feedback from the client user on at least a further portion of the sentiment values, the further feedback including an identification of a node from a statement tree and an adjusted sentiment value for the identified node;

modify the personalized client-specific sentiment model based on the further feedback to result in a further modified sentiment model, wherein at least one of the sentiment values associated with the plurality of nodes is modified; and store the further modified sentiment model as the personalized client-specific sentiment model for the client user.

17. The client analytics platform of claim 15, further configurable to present data from the first statement tree for each respective social media statement as a report listing the sentiment value associated with each of the plurality of nodes.

18. The client analytics platform of claim 15, further configurable to receive the feedback in the form of a feature vector for each of the plurality of nodes that has been modified.

19. The client analytics platform of claim 15, wherein, to analyze, the client analytics platform is configurable to parse each of the social media statements and classify each of the elements with the respective sentiment value.

20. The client analytics platform of claim 15, further configurable to apply the generic non-client specific model as a recursive neural network.

* * * * *